US012553285B2

(12) United States Patent
Maxfield et al.

(10) Patent No.: US 12,553,285 B2
(45) Date of Patent: Feb. 17, 2026

(54) LADDERS, FOOT MECHANISMS FOR LADDERS, AND RELATED METHODS

(71) Applicant: LITTLE GIANT LADDER SYSTEMS, LLC, Springville, UT (US)

(72) Inventors: B. Scott Maxfield, Mapleton, UT (US); Gary M. Jonas, Springville, UT (US); N. Ryan Moss, Mapleton, UT (US); Brian B Russell, Saratoga Springs, UT (US)

(73) Assignee: LITTLE GIANT LADDER SYSTEMS, LLC, Springville, UT (US)

( * ) Notice: Subject to any disclaimer, the term of this patent is extended or adjusted under 35 U.S.C. 154(b) by 547 days.

(21) Appl. No.: 17/884,405

(22) Filed: Aug. 9, 2022

(65) Prior Publication Data

US 2022/0381087 A1 Dec. 1, 2022

Related U.S. Application Data

(63) Continuation of application No. 16/841,294, filed on Apr. 6, 2020, now Pat. No. 11,408,226, which is a (Continued)

(51) Int. Cl.

| | |
|---|---|
| ***E06C 7/42*** | (2006.01) |
| ***E06C 1/12*** | (2006.01) |
| ***E06C 7/46*** | (2006.01) |

(52) U.S. Cl.

CPC .................. *E06C 7/42* (2013.01); *E06C 1/12* (2013.01); *E06C 7/423* (2013.01); *E06C 7/46* (2013.01)

(58) Field of Classification Search

CPC ... E06C 7/42; E06C 7/423; E06C 7/46; E06C 1/12

See application file for complete search history.

(56) References Cited

U.S. PATENT DOCUMENTS 838,275 A * 12/1906 Rich et al. ................ E06C 7/46 182/46
1,352,323 A * 9/1920 Stephan .................... E06C 7/46 182/109

(Continued)

FOREIGN PATENT DOCUMENTS

CN 1918359 A 2/2007
CN 200975209 Y 11/2007

(Continued)

OTHER PUBLICATIONS

PCT Search Report Written Opinion PCT App. No. PCT/US2018/018357, mailed May 2, 2018.
U.S. Appl. No. 62/404,672, filed Oct. 5, 2016.

*Primary Examiner* — Colleen M Chavchavadze
*Assistant Examiner* — Shiref M Mekhaeil
(74) *Attorney, Agent, or Firm* — Dorsey & Whitney LLP

(57) ABSTRACT

Various embodiments of ladders, ladder legs, ladder feet, foot mechanisms for ladders, and related methods are provided herein. In one embodiment, a foot is pivotal relative to a leg or rail of the ladder between a first position and at least a second position. A biasing force is applied to the foot to maintain the foot in either of the user-selected positions until a force is applied to pivot the foot to another position. In one embodiment, the foot mechanism maintaining the foot at a desired position may include a pair of pins that couple the foot to another component (e.g., a housing member, an insert member or a rail of the ladder). At least one of the two pins may be displaceable relative to the other pin during pivoting of the foot.

17 Claims, 15 Drawing Sheets

Related U.S. Application Data continuation of application No. 15/897,995, filed on Feb. 15, 2018, now Pat. No. 10,612,302.

(60) Provisional application No. 62/459,805, filed on Feb. 16, 2017.

(56) References Cited

U.S. PATENT DOCUMENTS

| | | | | |
|---|---|---|---|---|
| 1,973,226 | A * | 9/1934 | Rose | E06C 7/46 248/188.9 |
| 2,176,551 | A * | 10/1939 | Solem | B60B 33/045 182/15 |
| 2,407,575 | A * | 9/1946 | Ramsey | E06C 7/46 182/110 |
| 2,613,389 | A * | 10/1952 | Cramer | B60B 33/06 182/194 |
| 2,623,679 | A * | 12/1952 | Agombar | E06C 7/46 182/109 |
| 2,691,479 | A * | 10/1954 | Sharp | E06C 7/46 182/109 |
| 2,767,898 | A * | 10/1956 | Cramer | E06C 7/46 182/109 |
| 2,885,133 | A * | 5/1959 | Nelson | A01D 46/243 182/228.1 |
| 3,456,757 | A * | 7/1969 | Sain | E06C 7/46 182/111 |
| 3,641,619 | A * | 2/1972 | Roylance | E06C 1/397 182/15 |
| 3,693,756 | A | 9/1972 | Walker et al. | |
| 3,861,500 | A | 1/1975 | Dempsey | |
| 3,933,221 | A * | 1/1976 | Sorenson | E06C 7/44 182/172 |
| 4,011,926 | A * | 3/1977 | Larson | E06C 7/42 182/172 |
| 4,261,561 | A * | 4/1981 | Ilon | A61H 3/04 482/68 |
| 4,415,062 | A * | 11/1983 | Shaw | E06C 7/46 182/109 |
| 5,027,923 | A * | 7/1991 | Derome | E06C 7/44 182/201 |
| 5,154,255 | A * | 10/1992 | Kiska | E06C 7/46 182/111 |
| 5,273,133 | A * | 12/1993 | Thocher | E06C 7/44 182/202 |
| 5,370,203 | A * | 12/1994 | Kiska | E06C 7/42 182/109 |
| 5,551,529 | A * | 9/1996 | Molitor | E06C 7/44 182/204 |
| 5,590,739 | A * | 1/1997 | High | E06C 1/397 182/208 |
| 5,740,881 | A * | 4/1998 | Lensak | E06C 7/003 33/366.11 |
| 5,758,745 | A * | 6/1998 | Beggs | E06C 1/12 182/213 |
| 5,845,744 | A * | 12/1998 | Beck | E06C 7/44 182/204 |
| 6,026,931 | A * | 2/2000 | Swiderski | E06C 1/397 182/15 |
| 6,145,618 | A * | 11/2000 | Verenski | E06C 7/46 182/109 |
| 6,523,640 | B1 * | 2/2003 | Young | E06C 1/39 182/15 |
| 7,837,010 | B2 * | 11/2010 | Astor | E06C 7/46 182/220 |
| 8,210,314 | B1 * | 7/2012 | Polak | E06C 1/18 182/201 |
| 8,365,865 | B2 * | 2/2013 | Moss | E06C 7/00 182/172 |
| 8,807,277 | B1 * | 8/2014 | Reyna Lerma | E06C 7/42 182/108 |
| 8,973,710 | B2 * | 3/2015 | Moss | E06C 7/003 182/172 |
| 9,010,491 | B2 * | 4/2015 | Trang | E06C 7/46 182/201 |
| 9,038,776 | B2 * | 5/2015 | Green | E06C 7/46 182/108 |
| 9,068,395 | B1 * | 6/2015 | Green | E06C 7/44 |
| 9,145,733 | B2 | 9/2015 | Worthington et al. | |
| 9,573,609 | B2 * | 2/2017 | Yu | E06C 7/182 |
| 9,593,509 | B2 * | 3/2017 | Murray | E05B 65/0014 |
| 9,834,989 | B2 * | 12/2017 | Lanzafame | E06C 7/44 |
| 10,107,035 | B1 * | 10/2018 | Lanzafame | E06C 7/426 |
| 10,138,682 | B2 * | 11/2018 | Mora | E06C 7/42 |
| 2001/0035313 | A1 * | 11/2001 | Uridel | E06C 7/44 182/214 |
| 2004/0045770 | A1 * | 3/2004 | Duan | E06C 1/12 182/213 |
| 2006/0278474 | A1 * | 12/2006 | Cumbie | E06C 1/12 182/207 |
| 2007/0163839 | A1 * | 7/2007 | Dangrow | E06C 7/44 182/204 |
| 2007/0284190 | A1 * | 12/2007 | Chady | E06C 7/46 182/107 |
| 2008/0029341 | A1 * | 2/2008 | Cooper | E06C 7/423 182/107 |
| 2010/0300805 | A1 * | 12/2010 | Moss | E06C 1/12 182/172 |
| 2011/0127110 | A1 * | 6/2011 | Trang | E06C 7/46 182/129 |
| 2011/0226551 | A1 * | 9/2011 | Iverson | E06C 7/44 182/107 |
| 2014/0054111 | A1 * | 2/2014 | Lu | E06C 7/44 182/107 |
| 2015/0068842 | A1 | 3/2015 | Moss et al. | |
| 2015/0259981 | A1 * | 9/2015 | Bobek | E06C 7/188 182/107 |
| 2016/0123079 | A1 * | 5/2016 | Ballard | E06C 7/46 182/207 |
| 2017/0335627 | A1 * | 11/2017 | Parker | E06C 7/42 |
| 2018/0094488 | A1 | 4/2018 | Major et al. | |
| 2018/0179821 | A1 * | 6/2018 | Mora | E06C 7/46 |
| 2018/0230746 | A1 | 8/2018 | Maxfield et al. | |
| 2018/0230747 | A1 * | 8/2018 | Weston | E06C 7/46 |
| 2020/0240210 | A1 * | 7/2020 | Maxfield | E06C 1/06 |
| 2020/0325727 | A1 * | 10/2020 | Reyes Acosta | B29C 45/14336 |

FOREIGN PATENT DOCUMENTS

| | | | |
|---|---|---|---|
| CN | 104763321 | A | 7/2015 |
| KR | 200146389 | Y1 | 6/1999 |
| WO | 2018152318 | A1 | 8/2018 |

* cited by examiner

LADDERS, FOOT MECHANISMS FOR LADDERS, AND RELATED METHODS

CROSS-REFERENCE TO RELATED APPLICATIONS

This application is a continuation of U.S. patent application Ser. No. 16/841,294, filed 6 Apr. 2020, which is a continuation of U.S. patent application Ser. No. 15/897,995, now U.S. Pat. No. 10,612,302, filed 15 Feb. 2018, which application claims the benefit of U.S. Provisional Patent Application No. 62/459,805, filed 16 Feb. 2017, entitled LADDERS, FOOT MECHANISMS FOR LADDERS, AND RELATED METHODS, the disclosures of which are incorporated by reference herein in their entireties.

BACKGROUND

Ladders are conventionally utilized to provide a user thereof with improved access to elevated locations that might otherwise be inaccessible. Ladders come in many shapes, sizes and configurations, such as straight ladders, extension ladders, stepladders, and combination step and extension ladders (sometimes referred to as articulating ladders or multipurpose ladders). So-called combination ladders may incorporate, in a single ladder, many of the benefits of multiple ladder designs.

Ladders known as straight ladders and extension ladders are ladders that are not conventionally self-supporting but, rather, are positioned against an elevated surface, such as a wall or the edge of a roof, to support the ladder at a desired angle. A user then ascends the ladder to obtain access to an elevated area, such as access to an upper area of the wall or access to a ceiling or roof. A pair of feet or pads, each being coupled to the bottom of an associated rail of the ladder, are conventionally used to engage the ground or some other supporting surface. The feet or pads are typically either fixed (i.e., the do not move relative to the rails with which they are coupled) or they are configured to pivot between one position, wherein a relatively flat pad engages the ground, and another position (sometimes referred to as a "pick" position), where one or more spikes on an end of the foot are positioned to penetrate or dig into the ground when the ladder is in an orientation of intended use.

Extension ladders provide a great tool to access elevated areas while also being relatively compact for purposes or storage and transportation. However, there are still several areas for improvement in various types of ladders, including conventional extension ladders. For example, conventional pivoting feet on extension ladders are typically difficult to maintain in a desired position (e.g., either a standard position or the "pick" position when transporting and setting up the ladder for use. Thus, oftentimes when user desires to set a ladder up with the feet in a standard position (e.g., such that the flat portion of the foot engages the ground) the foot inadvertently pivots to a pick position and vice-versa. Often, one foot may pivot to one position while the other foot pivots (or remains) in the other position. These scenarios can be more than just a nuisance or an annoyance, they can become a safety hazard if the wrong position is used (depending on the type of ground or supporting surface being used) and, in some instances, may result in damage to a supporting surface (e.g., a wood floor in a residential building) or to the feet themselves when one or both feet inadvertently pivot to the wrong position.

There is a continuing desire in the industry to provide improved functionality of ladders while also improving the safety and stability of such ladders.

SUMMARY OF THE DISCLOSURE

The present disclosure includes various embodiments of ladders, ladder legs, ladder feet, foot mechanisms for ladders, and related methods. In accordance with one embodiment of the disclosure, a ladder leg is provided that includes a rail member, a housing member coupled with the rail member, and a foot coupled with the housing member. The foot is pivotal between a first position and at least second position relative to the housing member. At least one biasing member is configured to maintain a biasing force between the housing member and the foot at each of the first position and the second position.

In one embodiment, the ladder leg further comprises a first pin coupling the housing member and the foot with the rail member, and a second pin coupling the foot with the housing member.

In one embodiment, the biasing force is applied between the first pin and the second pin.

In one embodiment, a distance between the first pin and the second pin changes when the foot pivots from the first position to the second position.

In one embodiment, the ladder leg further comprises a seat member disposed between the first pin and the at least one biasing member.

In one embodiment, the housing member includes at least one wall having an elongated slot and an opening formed therein, wherein the first pin extends through the elongated slot and wherein the second pin extends through the opening.

In one embodiment, the foot includes at least one side wall having an opening and a cam groove formed therein, wherein the first pin extends through the opening of the at least one side wall and the second pin extends through the cam groove.

In one embodiment, the cam groove includes a curved path configured to effect the change of distance between the first pin and the second pin upon rotation of the foot from the first position to the second position.

In one embodiment, the ladder leg further comprises a first end notch at a first end of the cam groove, wherein the second pin engages the first end notch when the foot is in the second position.

In one embodiment, the foot is pivotal between the first position, the second position and at least a third position, and wherein the at least one biasing member is configured to maintain a biasing force between the housing member and the foot at the third position.

In one embodiment, the ladder leg further comprises an end notch at a second end of the cam groove, wherein the second pin engages the second end notch when the foot is in the third position.

In one embodiment, the foot includes a traction surface configured to engage a support surface when the foot is in the first position, and wherein the foot includes at least one engagement surface configured to engage a support surface when the foot is in the second position.

In one embodiment, the housing includes a traction surface configured to engage a support surface when the foot is in a third position relative to the housing member.

In one embodiment, the at least one biasing member is disposed in a channel formed in the housing member. In one embodiment, an abutment shoulder is formed at one end of the channel, providing a stop for a sleeve or seat member positioned against the biasing member.

In one embodiment, the ladder leg further comprises an insert member, wherein the at least one biasing member is disposed in a channel formed in the insert member.

In one embodiment, the at least one biasing member includes at least two coiled springs.

In one embodiment, the rail member is directly coupled with a plurality of rungs.

In another embodiment, the rail member is configured as an adjustable leg and is pivotally coupled with another rail member.

In accordance with one embodiment, a ladder is provided which may include a ladder leg according to any of the above embodiments.

In accordance with one embodiment, a ladder is provided that includes a first assembly having a first pair of spaced apart rails and a first plurality of rungs extending between, and coupled to, the pair of first pair of spaced apart rails. The ladder further includes an adjustable foot mechanism associated with the first assembly. The adjustable foot mechanism comprises a housing member, a foot coupled with the housing member and pivotal between at least a first position and a second position relative to the housing member, and at least one biasing member configured to maintain a biasing force between the housing member and the foot at each of the first position and the second position.

In one embodiment, the ladder further comprises a first pin coupling the housing member with the foot and a second pin coupling the housing member with the foot.

In one embodiment, the biasing force is applied between the first pin and the second pin.

In one embodiment, the adjustable foot mechanism is coupled with one rail of the first pair of rails.

In one embodiment, the adjustable foot mechanism is coupled with an adjustable leg member, the adjustable leg member being pivotally coupled with one rail of the first pair of rails.

In one embodiment, a distance between the first pin and the second pin changes when the foot pivots from the first position to the second position.

In one embodiment, the foot includes at least one side wall having an opening and a cam groove formed therein, wherein the first pin extends through the opening of the at least one side wall and the second pin extends through the cam groove.

In one embodiment, the cam groove includes a curved path configured to effect the change of distance between the first pin and the second pin upon rotation of the foot from the first position to the second position.

In one embodiment, the ladder further comprises a first end notch at a first end of the cam groove, wherein the second pin engages the first end notch when the foot is in the second position.

In one embodiment, the housing includes a traction surface configured to engage a support surface when the foot is in a third position relative to the housing member.

Features, components and aspects of any one embodiment described herein may be combined features components or aspects of other embodiments without limitation.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
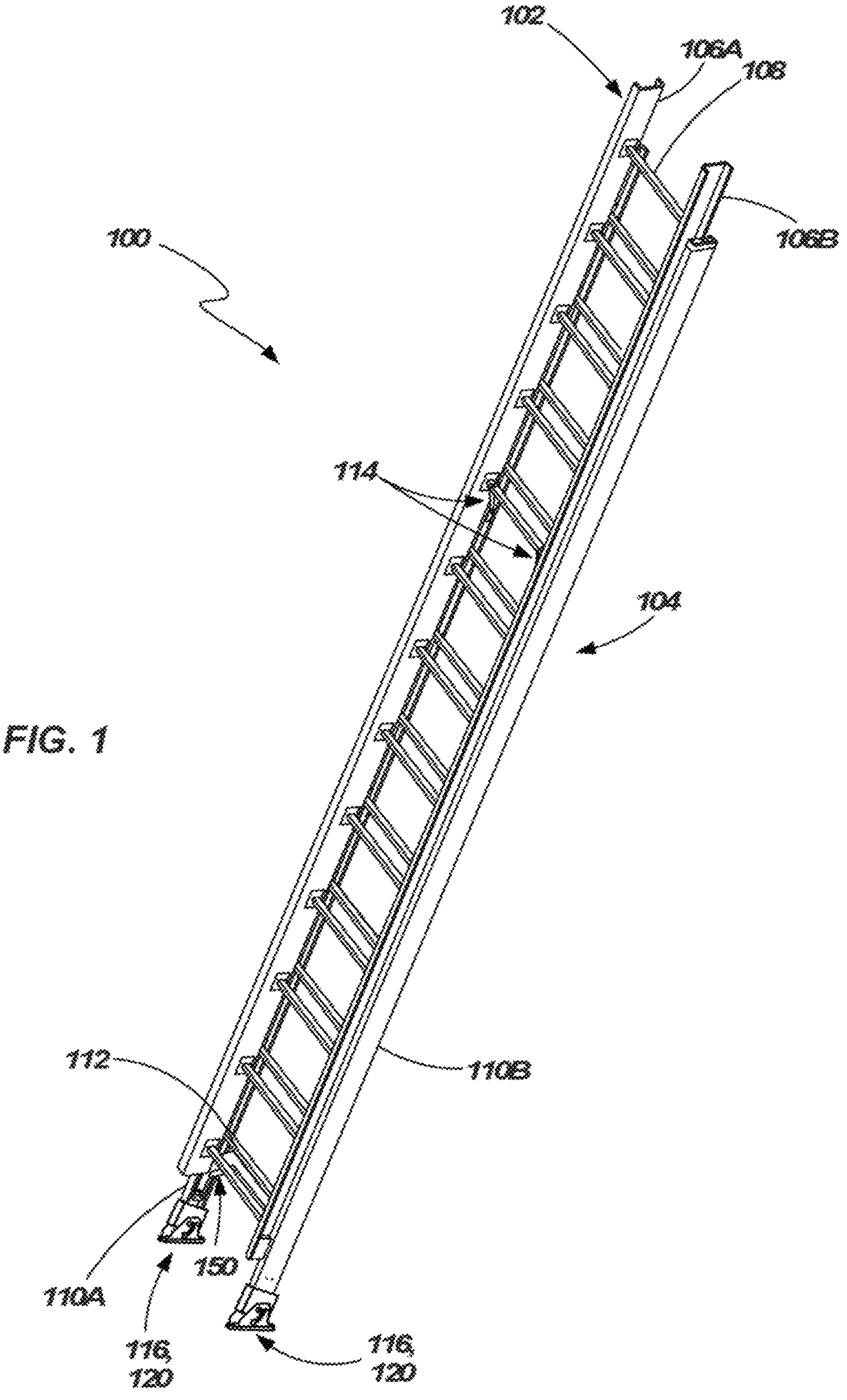
FIG. 1 is a perspective view of an extension ladder according to an embodiment of the present disclosure.

Referring to FIG. 1, a ladder 100 is shown according to an embodiment of the invention. The ladder 100 is configured as an extension ladder and includes a first assembly, which may be referred to as a fly section 102, and a second assembly, which may be referred to as a base section 104. The fly section 102 is slidably coupled with the base section 104 so as to adjust the ladder 100 to various lengths (or, rather, heights). The fly section 102 includes a pair of spaced apart rails 106A and 106B (which may be referenced generally as 106 herein for purposes of convenience) and a plurality of rungs 108 that extend between and are coupled to the rails 106. Similarly, the base section 104 includes a pair of spaced apart rails 110A and 110B (which may be referenced generally as 110 herein for purposes of convenience) with a plurality of rungs 112 extending between, and coupled to, the rails 110.

The rails 106 and 110 may be formed of a variety of materials. For example, the rails may be formed from composite materials, including fiberglass composites. In other embodiments, the rails 106 and 110 may be formed of a metal or metal alloy, including, for example, aluminum and aluminum alloys. The rails 106 and 110 may be formed using a variety of manufacturing techniques depending on various factors, including the materials from which they are formed. For example, when formed as a composite member, rails may be formed using pultrusion or other appropriate processes associated with composite manufacturing. In one embodiment, the rails 106 and 110 may be formed generally as C-channel members exhibiting a substantially "C-shaped" cross-sectional geometry. In other embodiments, the rails may be formed as a closed channel such that they exhibit, for example, a rectangular cross-sectional profile.

The rungs 108 and 112 may also be formed from a variety of materials using a variety of manufacturing techniques. For example, in one embodiment, the rungs 108 and 112 may be formed from an aluminum material through an extrusion process. However, such an example is not to be viewed as being limiting and numerous other materials and methods may be utilized as will be appreciated by those of ordinary skill in the art. In one embodiment the rungs 108 and 112 may include a flange member (also referred to as a rung plate) for coupling to associated rails 106 and 110. For example, the flanges may be riveted or otherwise coupled with their associated rails 106 and 110. Examples of rungs and flanges according to certain embodiments are described in U.S. Patent Application Publication No. 2016/0123079, published on May 5, 2016, the disclosure of which is incorporated by reference herein in its entirety.

One or more mechanisms, often referred to as a rung lock 114, may be associated with the fly and base sections 102 and 104 to enable selective positioning of the fly section 102 relative to the base section 104. This enables the ladder 100 to assume a variety of lengths (or, rather, heights when the ladder is in an intended operating orientation) by sliding the fly section 102 relative to the base section 104 and locking the two assemblies in a desired position relative to one another. By selectively adjusting the two rail assemblies (i.e., fly section 102 and base section 104) relative to each other, a ladder can be extended in length to nearly double its height as compared to its collapsed or shortest state as will be appreciated by those of ordinary skill in the art. The rung lock 114 is cooperatively configured with the fly section 102 and the base section 104 such that when the fly section 102 is adjusted relative to the base section 104, the associated rungs 106 and 110 maintain a consistent spacing (e.g., 12 inches between rungs that are immediately adjacent, above or below, a given rung). Examples of rung locks according to certain embodiments are described in the previously incorporated U.S. Patent Publication No. 2016/0123079. However, other types of rung locks may also by utilized as will be appreciated by those of ordinary skill in the art.

Other features and mechanisms described in previously incorporated U.S. Patent Publication No. 2016/0123079 may also be included in the ladder 100. For example, the fly section 102 and the base section may be arranged (including the rails and rungs of each respective section) so as to provide a ladder with a low profile or a small overall thickness or depth from the front surface of the rails 106 of the fly section to the rear surface of the rails 110 of the base section 104. In one embodiment, the back surface of the rails 106 of the fly section 102 may be at a position that is approximately half way between the front surface and the rear surface of the rails 110 of the base section 104.

The ladder 100 additionally includes a foot 116 and associated mechanism 120 coupled with the lower end of each of the rails 110A and 110B of the base section 104 to support the ladder 100 on the ground or other surface. The foot 116 may be configured so that it may be selectively adapted for use on a variety of surfaces (e.g., an interior surface such as the floor of a building, or the ground adjacent a building or other structure) as will be discussed in further detail below.

Figure 2:
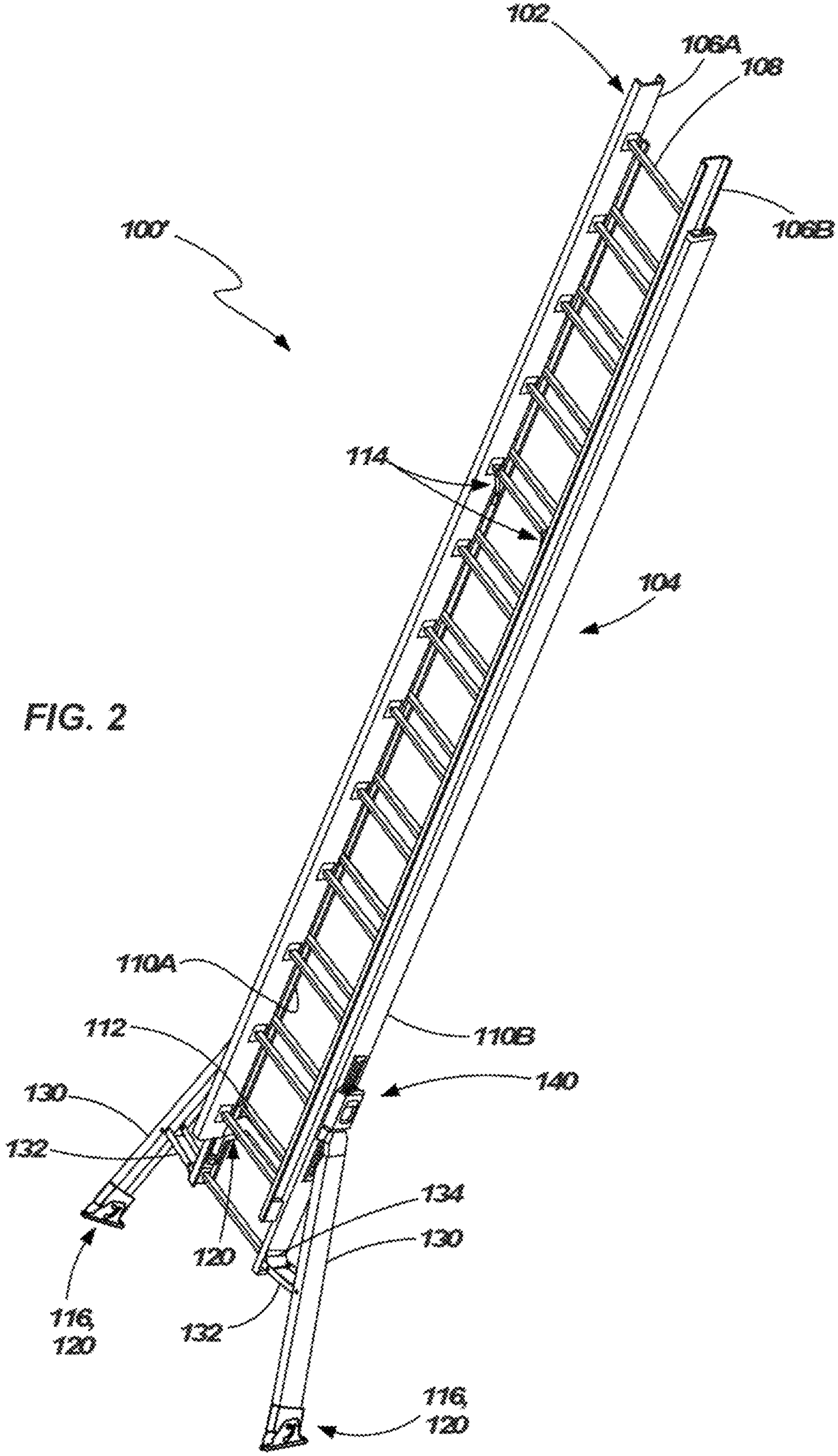
FIG. 2 is a perspective view of an extension ladder according to another embodiment of the present disclosure.

Referring to FIG. 2, a ladder 100' is shown in accordance with another embodiment of the present disclosure. The ladder 100' includes many of the same components as the ladder 100 shown in FIG. 1, including a fly section 102 with its rails 106 and rungs 108, a base section 104 with its rails 110 and rungs 112, and a rung lock 114. The ladder 100' also includes adjustable legs 130 positioned along the lower portion of the rails 110 of the base section 104. A swing-arm 132 is pivotally coupled to the base section 104 (e.g., by way of a bracket 134) and also pivotally coupled to a portion of the adjustable leg 130. A foot 116 may be coupled to the lower end of each leg 130 to support the ladder 100 on the ground or other surface. The foot 116 may be configured so that it may be selectively adapted for use on an interior surface (e.g., the floor of a building), or on a surface such as the ground as will be discussed in further detail below. The adjustable legs 130 may be configured so that a first end is hingedly coupled with an adjustment mechanism 140 which is slidably coupled with the rails 110 of the base section 104. The adjustment mechanism 140, therefore, enables the upper end of the adjustable legs 130 to be selectively positioned along a portion of the length of its associated rail 110. When the upper portion of the adjustable leg 130 is displaced relative to its associated rail 110, the lower portion of the leg 130, including its foot 116, swings laterally inward or outward due to the arrangement of the swing-arm 132 coupled between the leg 130 and the rail 110. Examples of adjustable legs 130 and associated adjustment mechanisms 140 are described in U.S. Provisional Patent Application No. 62/404,672, filed on Oct. 5, 2016, the disclosure of which is incorporated by reference herein in its entirety.

Other examples of adjustable legs and associated components (e.g., adjustment mechanisms) are described in U.S. Pat. No. 8,365,865, issued Feb. 5, 2013, to Moss et al., U.S. Pat. No. 9,145,733 issued Sep. 29, 2015, to Worthington et al., and U.S. Patent Application Publication No 2015/0068842, published on Mar. 12, 2015, the disclosures of which are incorporated by reference herein in their entireties.

Figure 3A:
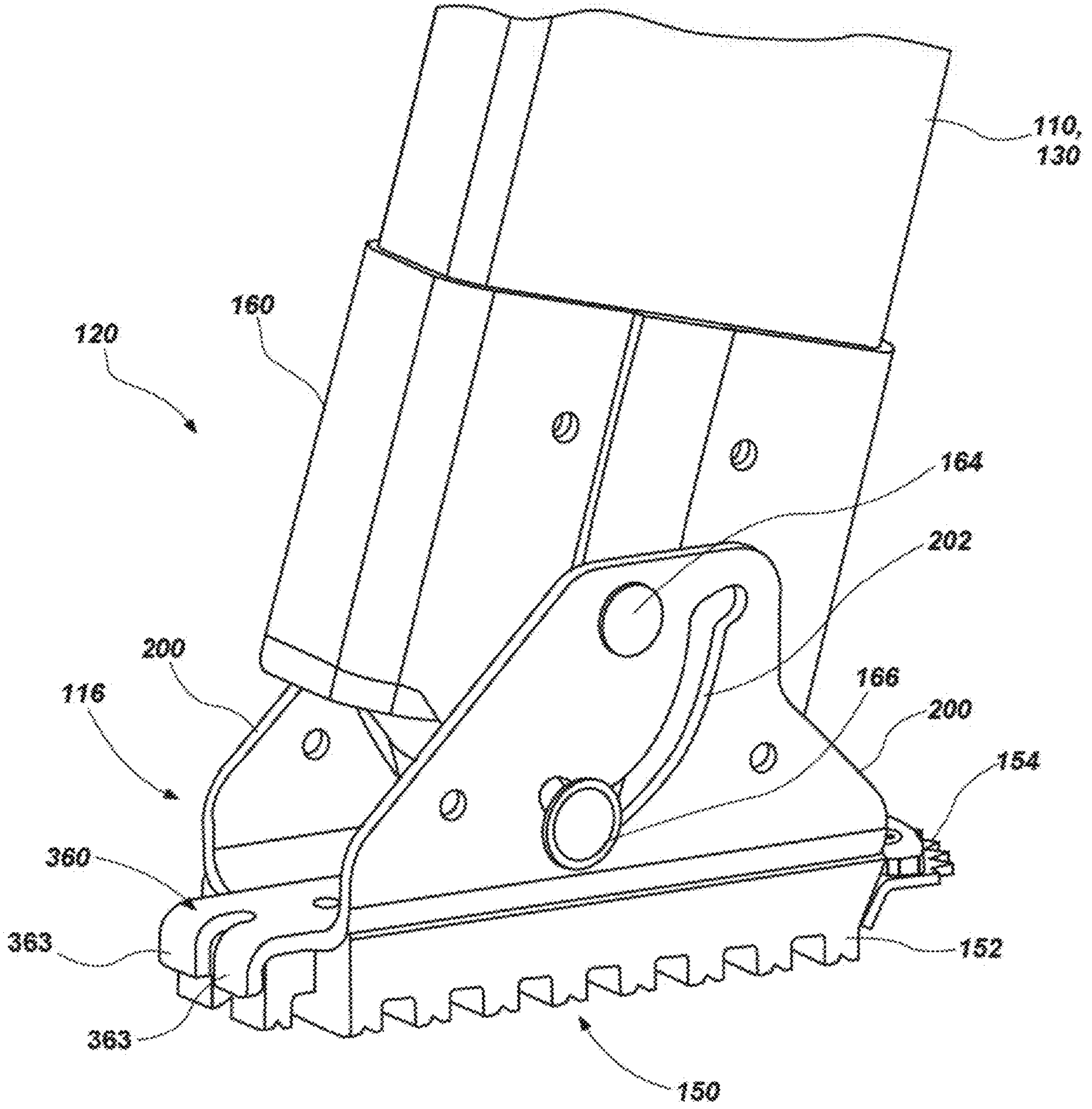
FIGS. 3A and 3B are enlarged perspective view of a foot of a ladder, with the foot in a first position and a second position, respectively, according to an embodiment of the present disclosure.
Figure 3B:
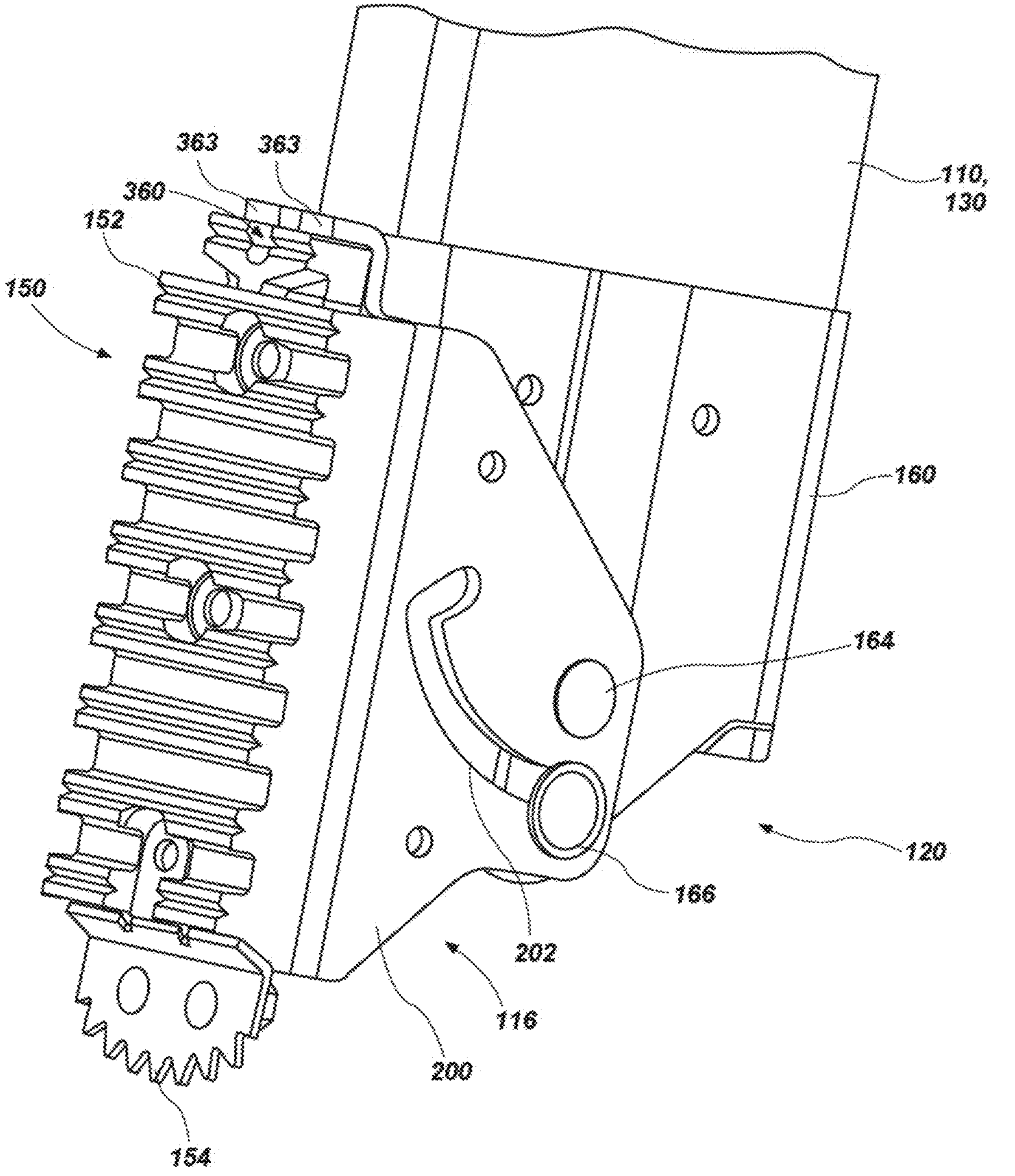
Figure 4:
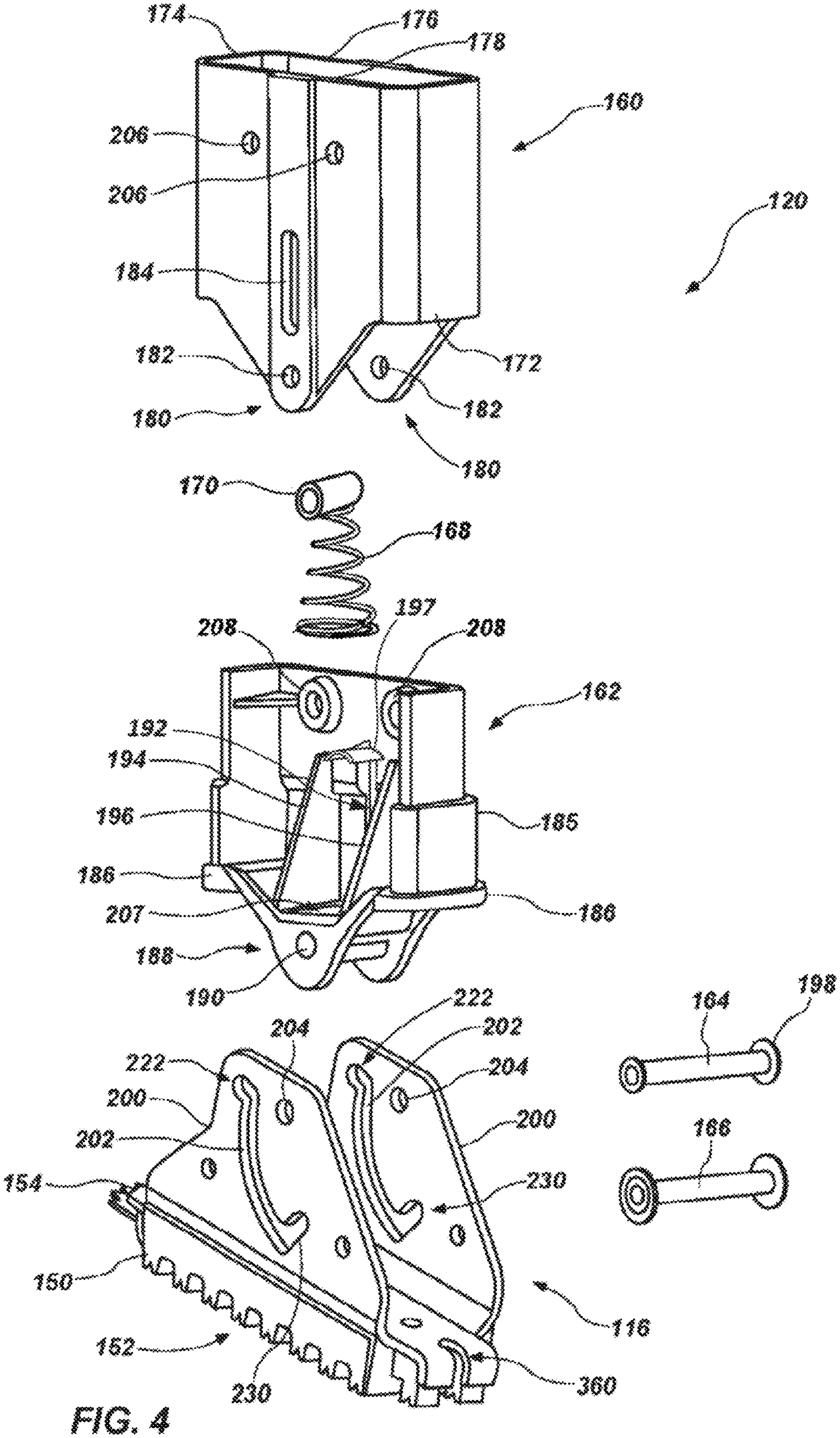
FIG. 4 is an exploded view of the foot shown in FIGS. 3A and 3B.

Referring to FIGS. 3A, 3B and 4, the ladder foot 116 and an associated mechanism 120 is shown. It is noted that for sake of convenience, the foot 116 and mechanism 120 are described as being associated with a rail 110, but that such may also be associated with an adjustable leg member 130 such as described above.

The foot 116 itself includes a pair of side walls 200 or flange members, with each side wall 200 having a cam groove 202 or (cam slot) and a pivot opening 204. As will be detailed further below, these features assist to make the foot 116 selectively positionable between at least two positions including, for example, a standard or default position (see FIG. 3A) and what may be referred to as the "pick" position (FIG. 3B). When the foot 116 is in the standard or first position, a first surface 150 (e.g., a traction surface) of the foot 116, which may include a padded, cushioned and/or slip reduction material 152, is configured for engagement with a supporting surface. The standard position may be used, for example, when the ladder is to be positioned on hard surface such as concrete, a wooden or tiled floor, or even on a carpeted surface. When the foot 116 is in the pick position, the first surface 150 is flipped upwards at an angle (relative to the standard position) such that one or more spikes 154, stakes or other penetrating features are oriented to penetrate or "dig in" to the ground soil when the ladder is placed on such soil and oriented for intended use. The foot 116 of the present disclosure further includes components and features to maintain the foot in any of the selected positions (e.g., the standard position shown in FIG. 3A or the pick position shown in FIG. 3B).

Referring more specifically to FIG. 4, the foot 116 is associated with an assembly having a housing member or a sleeve 160, an insert member or a plug 162, one or more pins 164 and 166 (which may also be referred to as the upper pin 164 and lower pin 166 for purposes of clarity), a biasing member 168, such as a coiled spring, and a sleeve member 170 (or bushing or other seat member). In one embodiment, the biasing member may include a conically shaped coiled spring. For example, in one specific embodiment, the conical spring may be approximately 1.5 inches in height, have a small diameter (e.g., an upper coil diameter) of approximately 0.375 inch and a large diameter (e.g., a lower coil diameter) of approximately 0.975 inch. The spring may be made of a stainless-steel material having a wire diameter of approximately 0.055 inch and the spring constant may be approximately 9 lbs./inch. Of course, other configurations of springs, and other types of biasing members, may be used. It is also noted that in some embodiments, the pins 164 and 166 may include rivets, bolts, or other fastening members.

In one embodiment, the housing member 160 may be configured as a section of channel (e.g., exhibiting a generally rectangular cross-sectional profile) having a front wall 172, a rear wall 174 and two opposing side walls 176 and 178 defining an interior space. In one particular embodiment, the side walls 176 and 178 may have lower portions that extend downward into an inverted apex 180. Openings 182 may be formed in the lower portions of the side walls 176 and 178. Elongated or longitudinally extending slots 184 (e.g., having a length greater than its width, with its length extending generally parallel to a length of an associated rail 110) are also formed in the sidewalls 176 and 178 of the housing member 160. The housing member 160 may be sized and configured to slide over the end of an associated rail 110 of the base section 104 such as seen in FIGS. 3A, 3B and 5A-5C. In one embodiment, the housing member 160 may be formed of a metallic material (e.g., steel, stainless steel, aluminum, or other metals or metal alloys). In other embodiments, the housing member 160 may be formed of a plastic or composite material.

The insert member 162 includes a body portion 185 that, in one embodiment, is sized and configured for insertion into the interior area defined by a rail 110 of the base section 104. For example, the rails 110 of the base section 104 may be formed as a closed channel, as a C-shaped channel or they may exhibit some other cross-sectional profile having a generally open interior area. The body portion 185 (or a portion thereof) may be configured to conformally fit within the interior area of such a rail profile. As noted above, in some embodiments, a portion of the insert member 162 may be configured to be inserted into an interior portion of the adjustable leg member 130.

The insert member 162 may include flanges 186 configured to abut against the lowermost edge of the rail 110 (e.g., the lower edges of the front and rear walls 172 and 174) into which it is inserted (e.g., see FIG. 3A). The insert member 162 may further include a downward extending portion 188 having an aperture 190 extending therethrough. An elongated slot 192 may also be formed in the body portion 185 of the insert member 162.

When assembled with the housing member 160, the aperture 190 of the insert member 162 may align with the openings 182 of the housing member 160. Likewise, when assembled, the slot 192 of the insert member 162 may align with the elongated slots 184 of the housing member 160. The insert member 162 may additionally include a pair of interior walls 194 and 196 positioned adjacent the slot 192 and defining a channel that is sized and configured to receive the biasing member 168 and the sleeve member 170 therebetween. An abutment shoulder 197 or other wall member may also be formed adjacent the upper end of the slot 192 for the sleeve member 170 to abut against and act as a stop when the upper pin member 164 is displaced upwards. In one embodiment, the insert member 162 may be formed of a plastic material. In other embodiments, composite materials or metallic materials may be used to form the insert member 162.

When assembled, the body portion 185 of the insert member 162 (or at least a portion thereof) is inserted in the housing member 160 such that the shoulder portion 186 abuts the lower edges of the front and rear walls 172 and 174 as noted above. The housing member 160 and insert member 162 may be coupled with a rail by way of fastening members (e.g., rivets, bolts, screws) through openings 206 in the housing member and aligned openings 208 in the insert member 162.

The upper pin 164 extends through the slots 184 of the housing member 160, through the slot 192 of the insert member 162, and through the openings 204 in the sidewalls 200 of the foot 116. A washer 198 may be placed on the upper pin 164 and positioned to abut against a portion of the insert as the pin 164 is displaced within the slot 192 of the insert member, as shall be shown below. The addition of the washer 198 may provide added strength to the assembled mechanism and facilitate the sliding displacement of the upper pin 164 within the slot 192. Of course, washers and other similar structures may be used with the lower pin 166 and its connection to various components as well (e.g., positioned between, and in contact with, a head of the pin 166 and the side wall 200 of the foot).

The lower pin 166 extends through the openings 182 of the housing member 160, the opening 190 of the insert member 162 and the cam groove 202 of the foot 116. The biasing member 168 is positioned laterally between the two interior walls 194 and 196 and also between a lower wall 207 or floor of the insert member 162 and the sleeve member 170 through which the upper pin 164 passes. In some embodiments, the sleeve member 170 does not include a tubular member, but may be a component that is positioned between the biasing member 168 and the upper pin 164 and configured, for example, with a concave surface to engage with or to cradle the upper pin 164. It is noted that neither of the pins 164 or 166 extend through any portion of the rail 110 in this particular embodiment, although at least one of them may extend through the rail in other embodiments such as described below. It is further noted that when upper pin 164 is removed from the assembly (e.g., to replace the foot 116 due to wear), that the biasing member 168 pushes the sleeve member 170 up against the abutment shoulder 197, retaining the biasing member 168 and sleeve member 170 in position, making reassembly (and even initial assembly) of the foot 116 and foot mechanism 120 with the ladder 100, 100' simpler and more efficient.

When assembled, the biasing member 168 maintains a biasing force between the two pins 164 and 166, causing the foot 116 to remain in a desired position—whether that be the standard position or the pick position as described above with respect to FIGS. 3A and 3B—or another position such as will be described in further detail below.

Figure 5A:
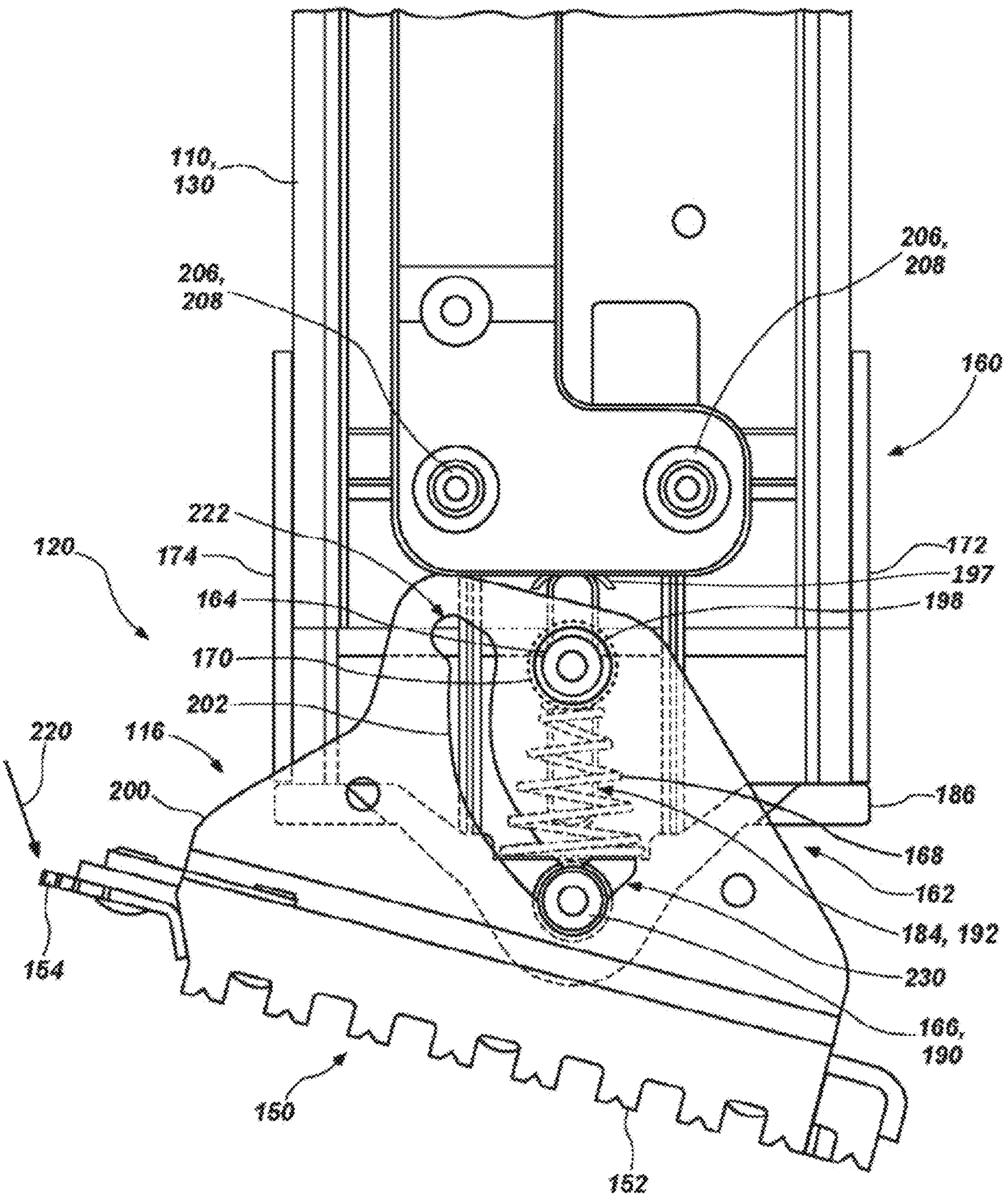
FIGS. 5A-5C a partial cross-section views of the foot shown in FIGS. 3A and 3B, with the foot being in different positions or states.
Figure 5B:
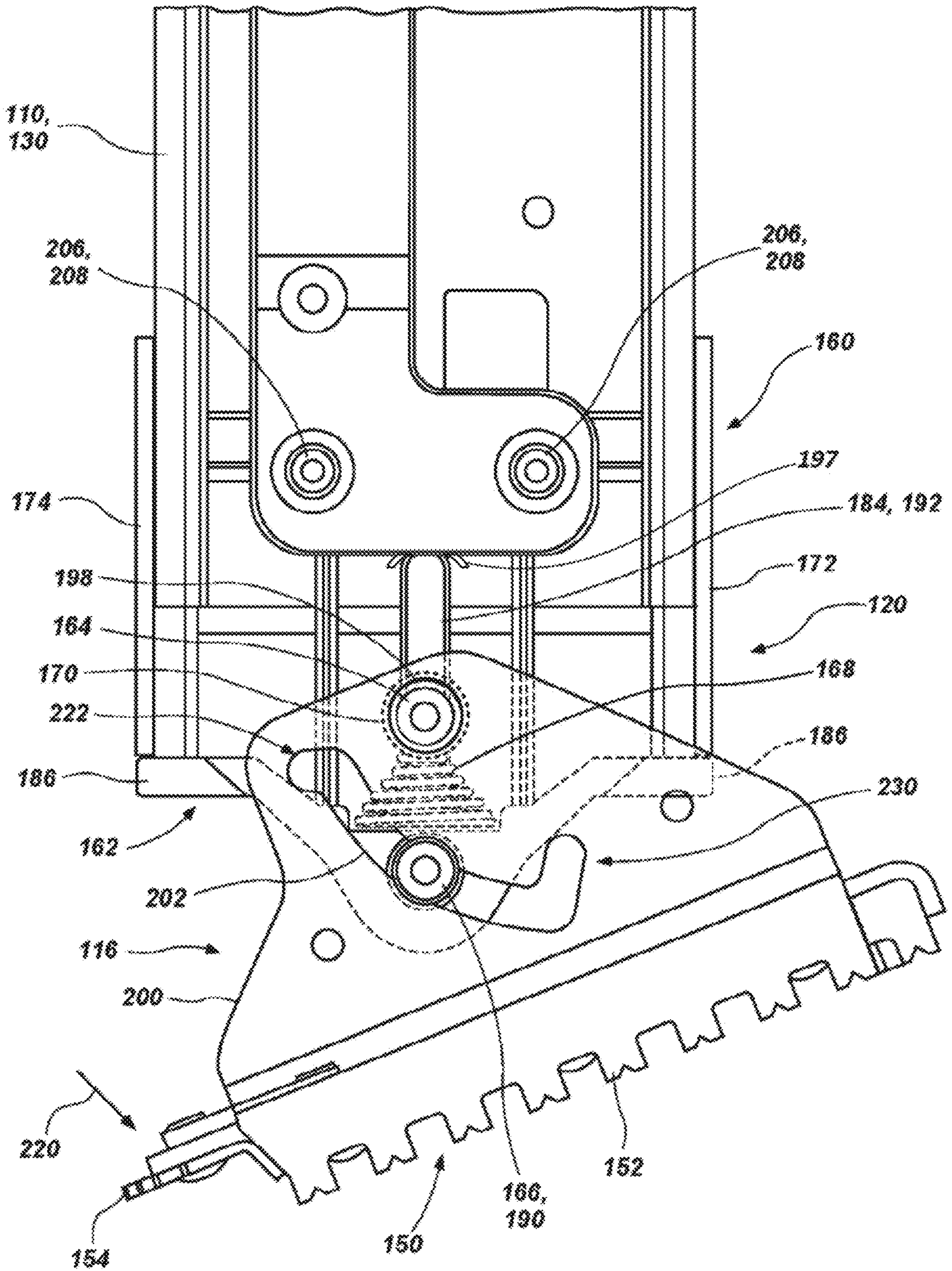
Figure 5C:
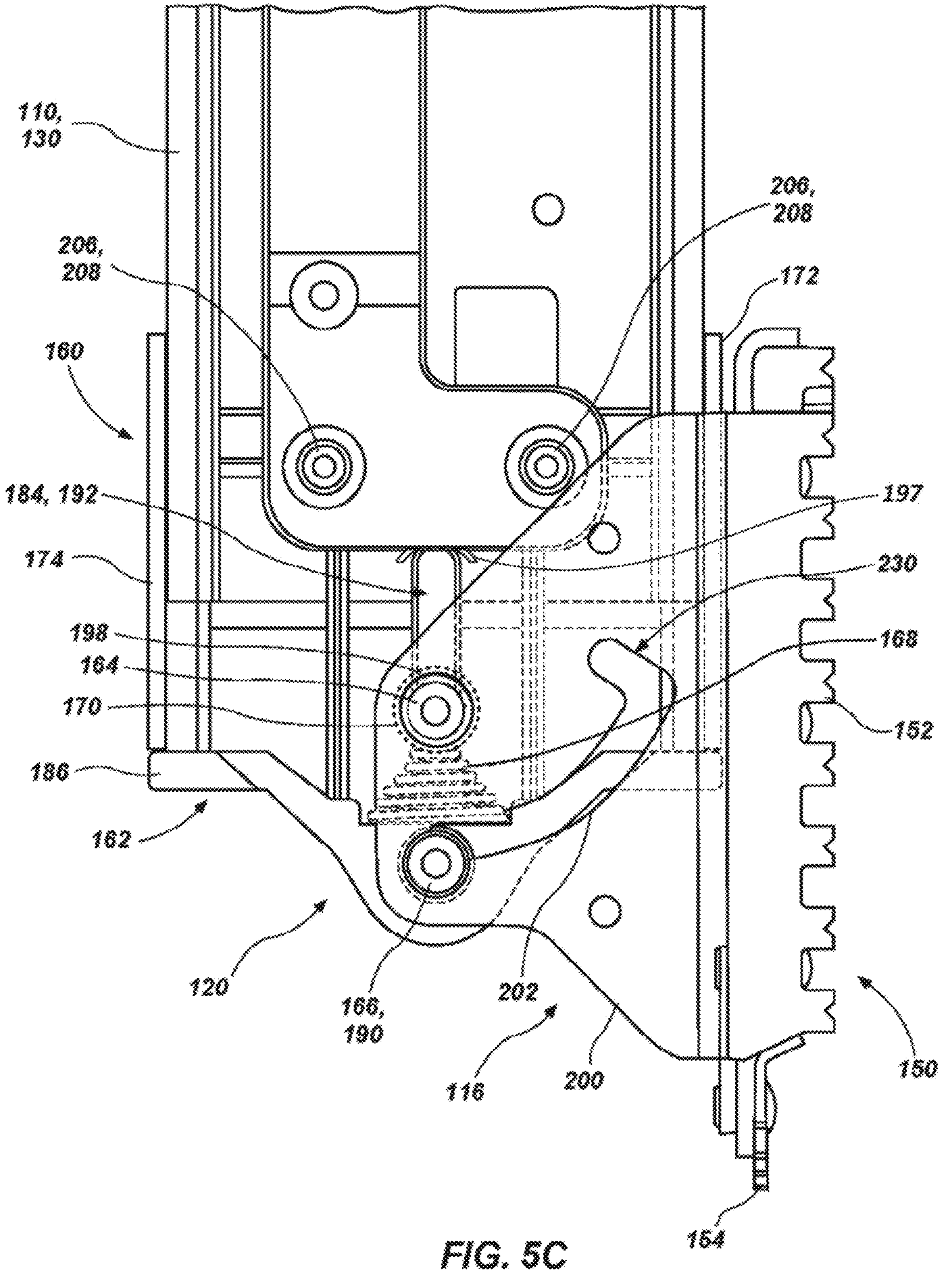

With reference to FIGS. 5A-5C, the foot 116 and foot mechanism 120 are shown in partial cross-sectional view, with portions of the foot 116 (e.g., the side wall 200) being rendered partially translucent or transparent in order to depict the operation of the mechanism 120 as the foot 116 transitions from one position or state to another. As seen in FIG. 5A, when the foot 116 is in the standard or default position, the biasing member 168 provides a biasing force between the two pins 166 and 164. Due to the arrangement of the various components, this biasing force causes a force to be applied between the lower pin 166 and the upper pin 164 which translates to a force being applied between the insert member 162 and the foot 116. The biasing force causes the foot 116 to naturally rotate such that the lower pin 166 is positioned at the lower end of the cam groove 202—at the "V" or transition between the cam groove 202 and an end notch 230—which might be considered the "minimum" of the curve or path that defines the cam groove. The biasing force maintains the foot in the default position until an external force is applied to the foot 116 to cause it to rotate relative to the insert member 162, the housing member 160 and the rail 110 as discussed in further detail below.

It is noted that this position may be correlated with a particular angle of the ladder when in an orientation of intended use. For example, in one embodiment, when the lower pin 166 is positioned at the "V" between the cam groove 202 and the end notch 230, the foot 116 is positioned at an angle relative to the rails 110 to accommodate the ladder being positioned at, for example, a 75.5° relative to horizontal support surface on which the ladder is placed. In one embodiment, the end notch 230 provides for some minor variation relative to the desired default position to accommodate for varying terrains and support structures as necessary.

When a sufficient force is applied to the foot 116 (e.g., a force such as represented by arrow 220, the foot begins to rotate relative to the insert member 162, the housing member 160 and the rail 110. However, the path of the cam groove 202 combines with the arrangement of the pins 164 and 166 such that the foot does not rotate about a fixed point relative to the other components (i.e., the rail 110, the housing member 160 or the insert member 162). Rather, as can be seen in FIG. 5B, as the foot 116 rotates, the cam groove 202 slides along the lower pin 166 (which is fixed relative to the insert member 162 by way of opening 190) causing the side walls 200 of the foot 116 to pull down on the upper pin 164 which is, in turn, displaced within and along the slots 184 and 192 (see FIG. 4), compressing the biasing member 168 as the upper pin 164 is displaced closer to the lower pin 166. It is noted that the exemplary force 220 is not intended to be limiting, and that forces may be applied to other portions of the foot 116 to effect rotation thereof.

As seen in FIG. 5C, when the foot 116 has rotated into the pick position, due to the path of the cam groove 202, the upper pin 164 is displaced along the slots 184 and 192 such that it is even closer to the lower pin 166, compressing the biasing member 168 and causing the foot 116 to be positioned such that an end notch 222 (see FIGS. 4, 5A and 5B) extending from the cam groove 202 is pushed up against the lower pin 166 in an engaging or locking fashion, thus maintaining the foot 116 in the pick position until a user applies a sufficient force to move the foot 116 in a direction to disengage the lower pin 166 from the end notch 222 such that it is again within the cam groove 202 wherein the foot 116 can be rotated again back towards the default position. It is noted that if the foot 116 is not positioned such that the lower pin 116 is engaged within the end notch 222, then the biasing force of the spring 168 will cause the foot 116 to return to the default position as shown in FIG. 5A. Thus, the foot 116 will always be maintained in a desired position, whether it be the standard/default position or the pick position, whichever the user has chosen.

Figure 6A:
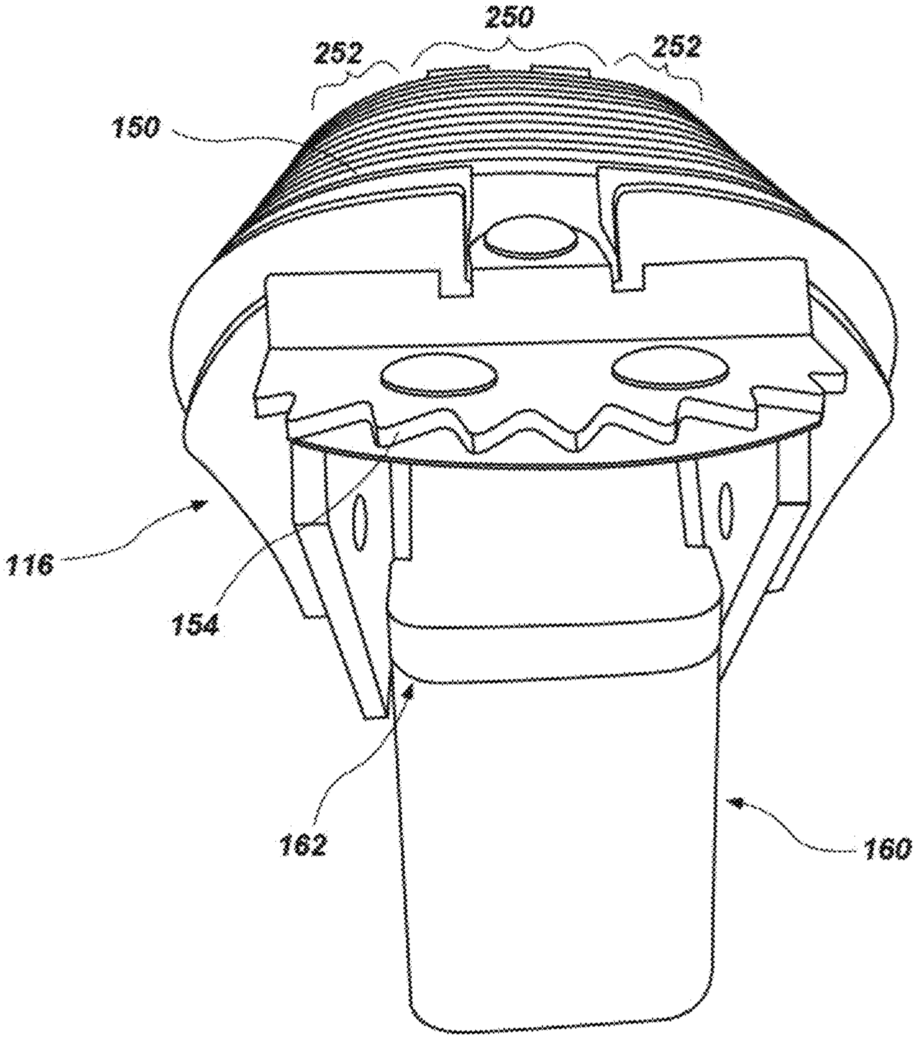
FIGS. 6A and 6B are front and upper perspective views of a foot according to an embodiment of the present disclosure.
Figure 6B:
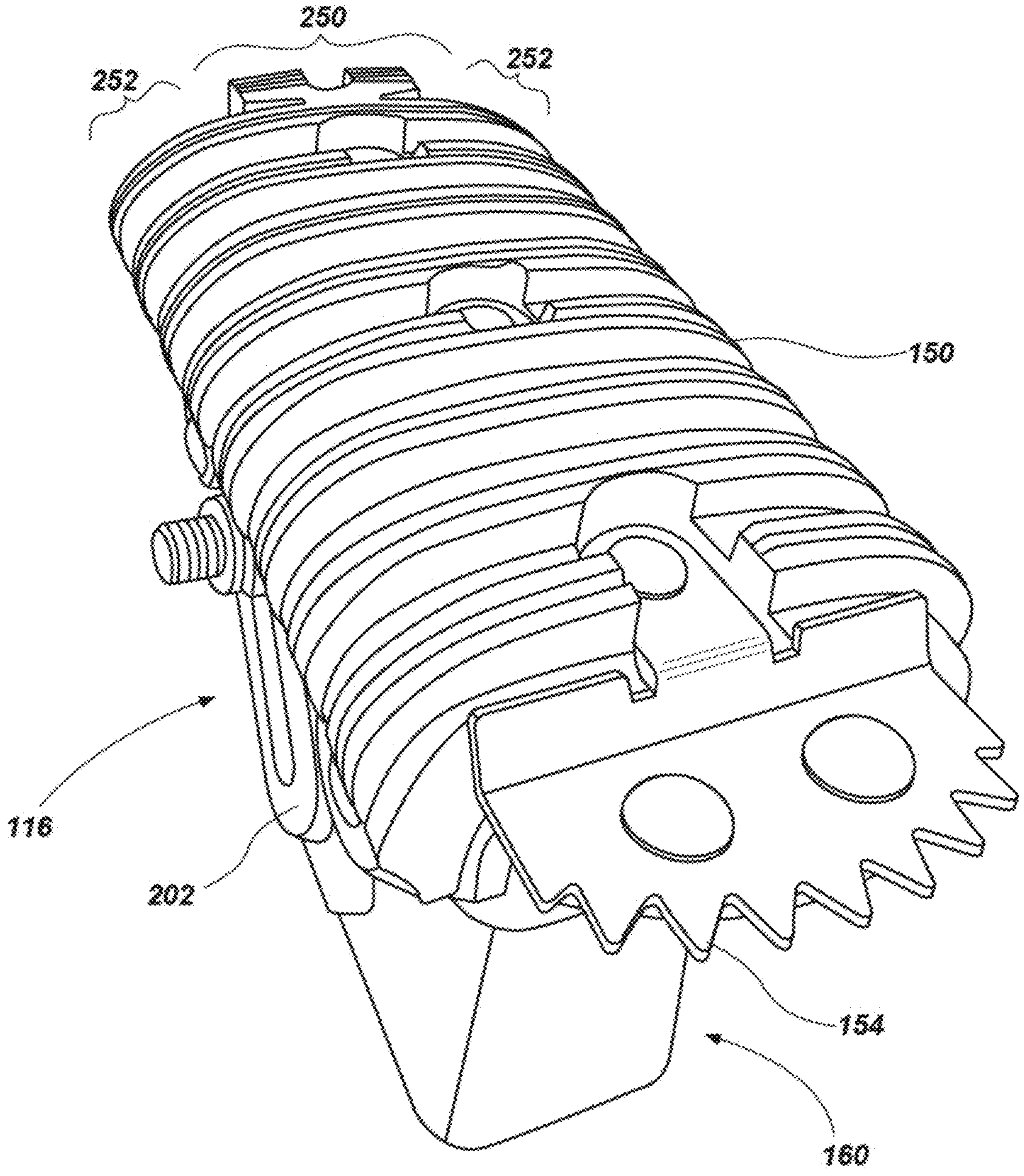

Referring briefly to FIGS. 6A and 6B, other aspects and features of the foot 116 may be seen. For example, in one embodiment, the traction surface 150 of the foot 116 may be formed having a generally arcuate profile across its width. For example, a first section 250 of the width of the traction surface 150 may be generally flat, or it may exhibit a curve of a relatively large radius as shown, while two outer sections 252 of the profile may exhibit a curve of a smaller radius. Furthermore, the profile of the traction surface 150 across its width is substantially symmetrical relative to a plane extending lengthwise through the traction surface and dividing the traction surface into substantially equal halves (e.g., two sides with half of the first section 250 and one of the outer sections 252 in each side). The symmetrical configuration of the profile of the traction surface 150 provides significant benefits in being able to manufacture a single foot 116 that is useable on either rail 110 or either adjustable leg 130. In other words, the feet do not have to be manufactured as a "right hand" or a "left hand" part. This provides particular advantage for embodiments such as described with respect to FIG. 2, wherein the adjustable legs 130 may be positioned at a variety of angles, including substantially vertical (wherein the first section 250 of the traction surface 150 has primary contact with the ground) or at some another angle relative to their associated rails (wherein one of the two outer sections 252 may have primary contact with the ground). It is noted that the spikes 154 or penetrating portion of the foot 116 may be likewise configured to be symmetrical such that they maintain effectiveness in engaging the ground even when the adjustable legs 130 are positioned at any of a variety of different angles relative to the ground or support surface.

Figure 7A:
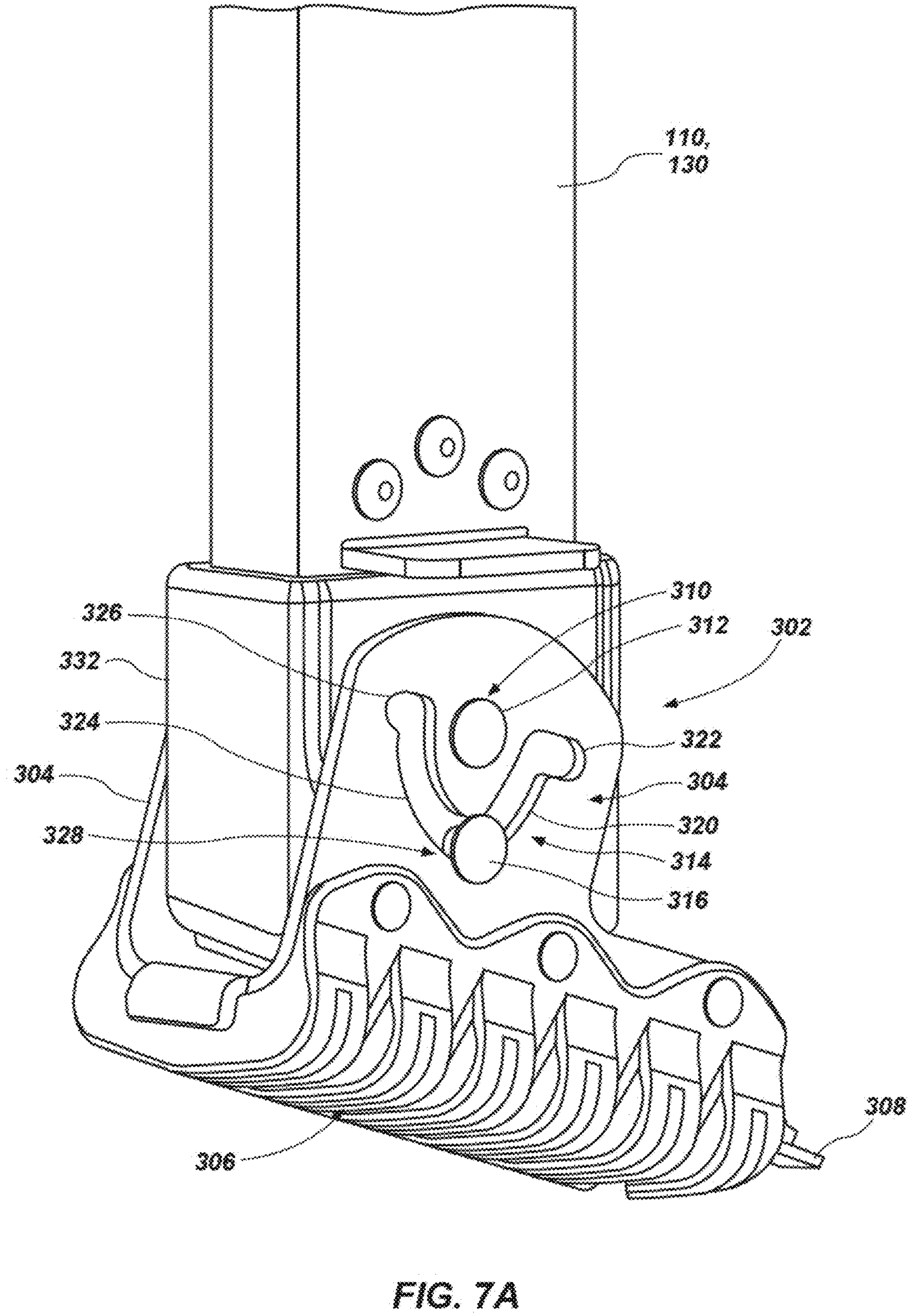
FIGS. 7A-7C are perspective views of another foot for a ladder according to another embodiment of the present disclosure, wherein the foot is in various positions or states.
Figure 7B:
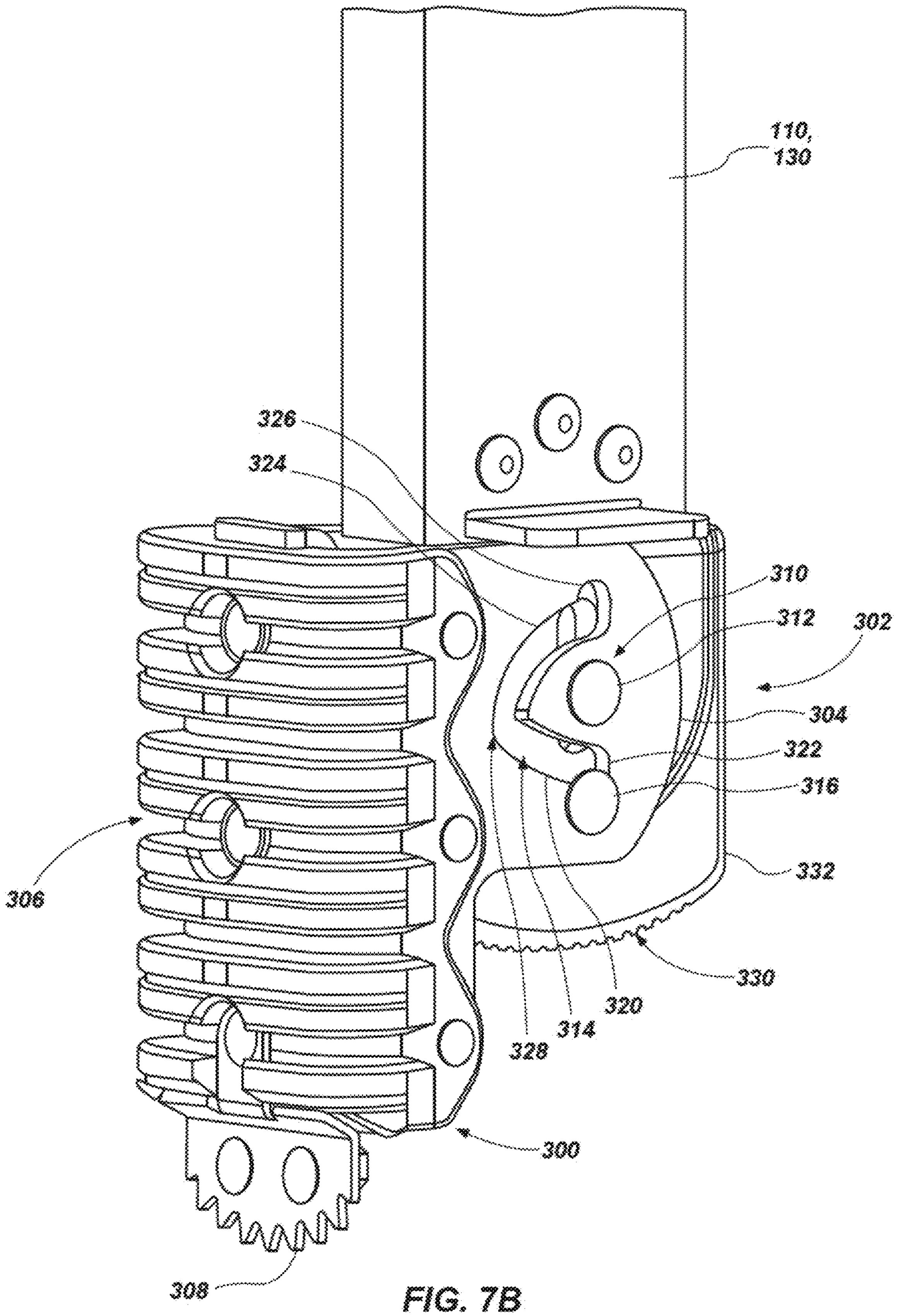
Figure 7C:
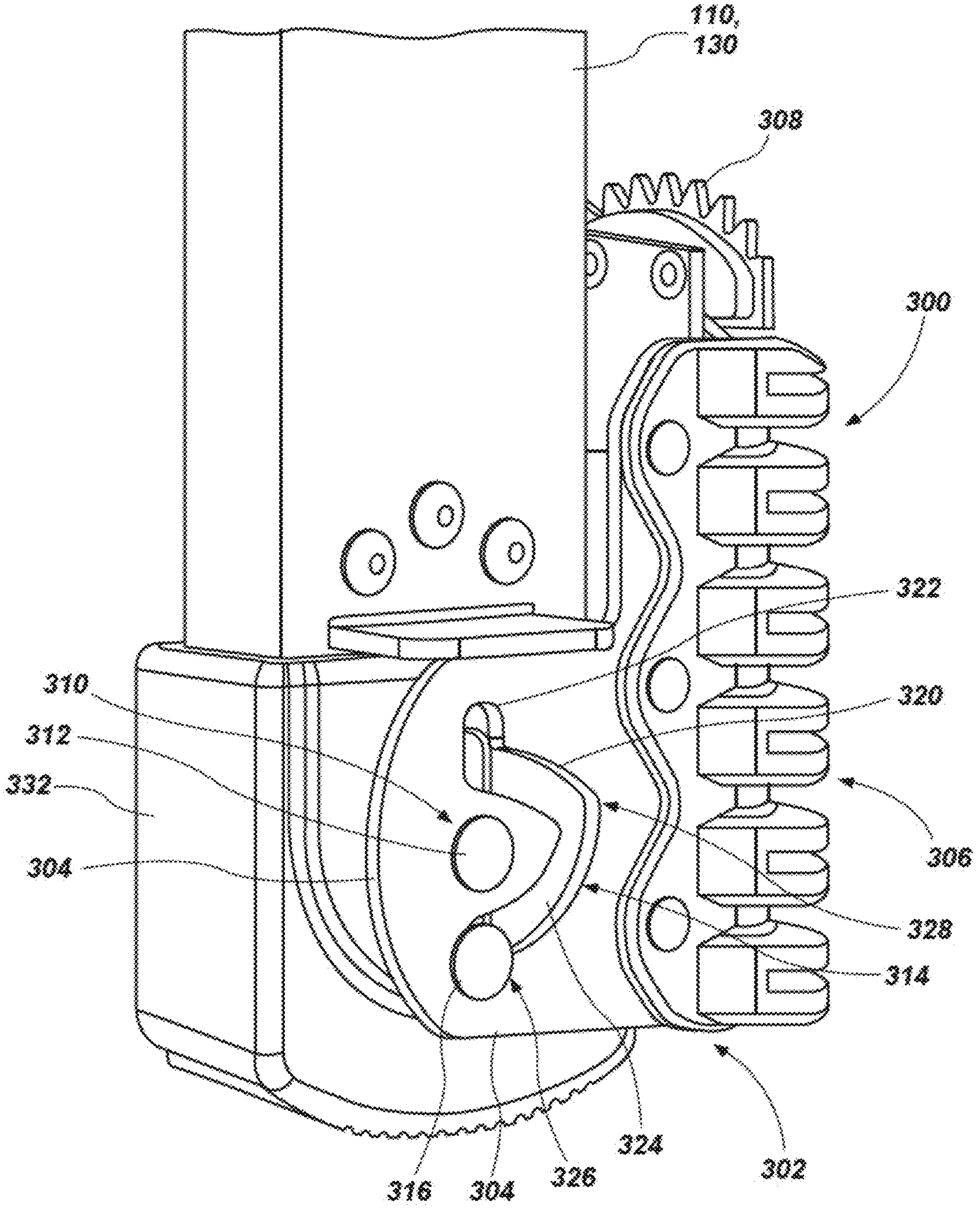

Referring now to FIGS. 7A-7C, a foot 300 and an associated mechanism 302 are shown in accordance with another embodiment of the present disclosure. The foot 300 may be configured substantially similar to the foot 116 described above, having side walls 304, a lower traction surface 306, a plurality of spikes 308 or penetrating structure, and opening 310 to receive a first, upper pin 312, and a cam groove 314 to receive a second, lower pin 316. The cam groove 314 is configured with a different curve or path than that which is shown and described above with respect to foot 116. The cam groove 314 includes a first path 320 leading to a first end notch 322 and a second path 324 leading to a second end notch 326, where the first path 320 and the second path 324 are connected at an inverted apex 328.

The foot 300 is configured to be selectively maintained at one of three different positions. For example, the first position is what may be referred to as a standard or default position such as is shown in FIG. 7A. As has been described above, when the foot 300 is in a default position, the traction surface 306 is configured to engage the ground or supporting surface. The foot 300 may be rotated in a first direction relative to its rail 110 into a second position, which may be referred to as a pick position, such as shown in FIG. 7B. As described above, when in the pick position, the foot 300 is configured to engage the ground or supporting surface with the spikes 308 or other penetrating structure. The foot 300 may also be rotated in a second direction relative to the rail 110 (opposite that of the first direction) to a third position, referred to as a stowed position, such as shown in FIG. 7C. When the foot 300 is in the stowed position, the foot 300 does not engage the ground or support structure when the ladder 100 is in an orientation of intended use. Rather, a traction surface 330 which may be associated with the housing member 332 (of the foot mechanism 302) engages the ground or support surface. In other words, the foot 300 rotates to a position such that it is above the lowermost portion (e.g., the traction surface 330) of the housing member 332 (or associated rail or adjustable leg) when in the stowed position.

Such a configuration enables the user of a ladder 100 to utilize the ladder in an outdoor or other environment where the foot 300 may get soiled (e.g., with the foot 300 in the default or pick positions being used on grass, dirt or other dirty environments), and also subsequently use the ladder 100 in a clean environment (such as the inside of a house or office space) by placing the (potentially soiled) foot 300 in a stowed positioned and engaging the ground with the unsoiled traction surface 330 of the housing member 332.

Figure 8:
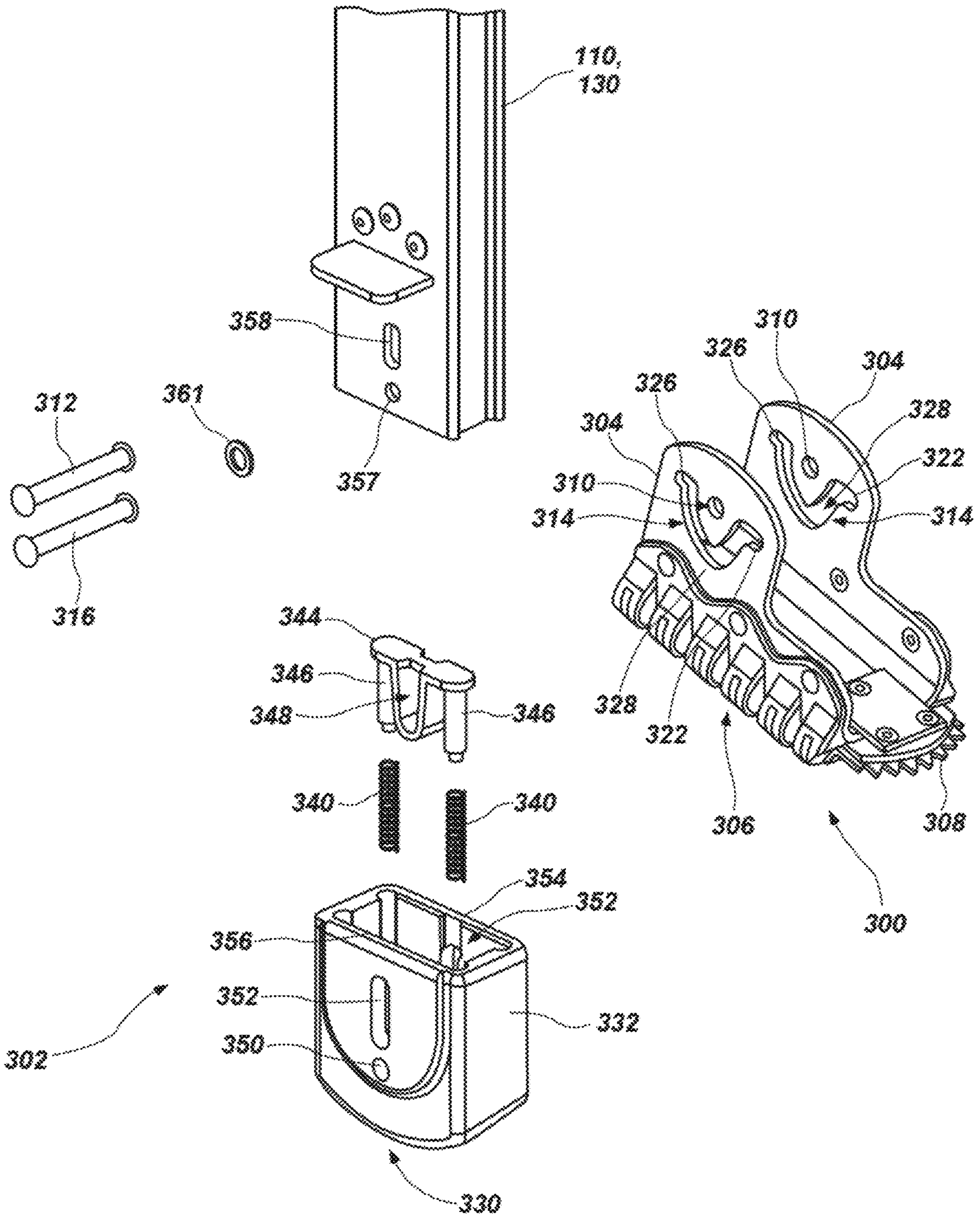
FIG. 8 is an exploded view of the foot shown in FIGS. 7A-7C.
Figure 9:
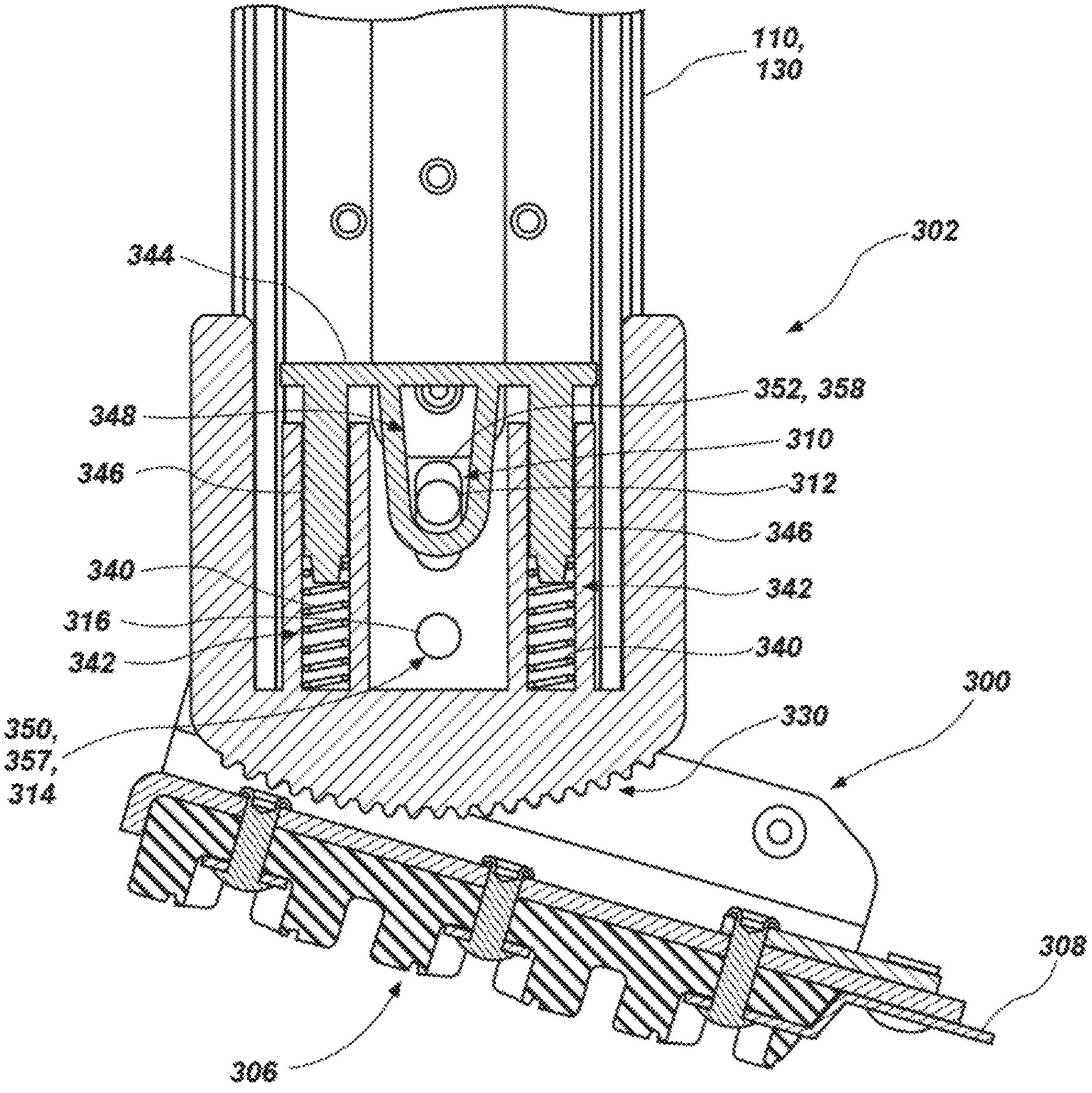
FIG. 9 is a partial cross-sectional view of the foot shown in FIGS. 7A-7C.

Referring to FIGS. 8 and 9, additional features and components of the foot 300 and associated mechanism 302 are described. The mechanism 302 includes one or more biasing elements 340 that are positioned in associated channels 342 formed in the interior of the housing member 332. A displaceable insert or seat member 344 is also positioned in the interior portion of the housing member 332 and includes elongated protrusions 346 configured to engage the biasing members 340 and an opening 348 configured to receive the upper pin member 312 therethrough. The housing member 332 also includes openings 350 and slots 352 formed in its side walls 356, such as has been described above with respect to other embodiments. Likewise, corresponding openings 357 and slots 358 are formed in the sidewall or sidewalls of the rail 110 (depending on, for example, whether the cross-sectional profile of the rail is an open channel or a closed channel configuration).

When assembled, the upper pin 312 extends through the openings 310 of the foot 300, the slots 352 in the sidewalls 356 of the housing member 332, the slots 358 in the sidewalls of the rail 110, and the opening 348 of the seat member 344. The lower pin 316 extends through the cam grooves 314 of the foot 300, the openings 350 of the housing member, and the openings 357 of the sidewalls of the rail 110. One or more washers 361 may be positioned on either, or both, of the pins 312 and 316 in a manner such as discussed above with respect to other embodiments. The foot 300 and associated mechanism 302 operate substantially similar to that which has been described above, with the upper pin 312 being displaced along the channels 352 and 358 upon rotation of the foot 300, due to the curved path of the cam groove 314. Displacement of the upper pin 312 within the channel controls the compression of the biasing members 340, maintaining a desired level of force on the foot 300, thus maintaining the foot 300 in one of the described positions.

More specifically, when the foot is in the position shown in FIG. 7A (default position), the biasing members 340 cause the foot to maintain that position by applying a biasing force between the two pins 312 and 316 such that the inverted apex 328 of the cam groove 314 maintains engagement with the lower pin 316.

When the foot 300 is rotated to the position shown in FIG. 7B (pick position), the arrangement of the various components causes the lower pin 316 to engage the first notch 322, maintaining the foot 300 in the pick position until a sufficient force is applied to the foot 300 by a user to disengage the lower pin 316 from the first notch 322 and rotate it to a different position.

When the foot 300 is in the position shown in FIG. 7C (stowed position), the arrangement of the various components causes the lower pin 316 to engage the second notch 326, maintaining the foot 300 in the stowed position until a sufficient force is applied to the foot 300 by a user to disengage the lower pin 316 from the second notch 326 and rotate it to a different position.

The arrangement of components results in the foot 300 being maintained in any of the selected positions (default, pick or stowed) until a user affirmatively rotates the foot 300 to a different selected position. Thus, a user can position the ladder with confidence that the feet are in a desired position and not randomly pivoting or rotating to a different (undesired) position prior to setting the ladder on a selected supporting surface.

It is noted that the feet described herein may include other features or aspects as well. For example, the feet 116 and 300 may include a securing feature for securing the foot relative to a support surface. For example, in one embodiment, the securing feature may include an open-faced notch or slot 360 formed in the front surface of a foot 116 or 300 between a pair of extending portions 363, which may have tips that curve downward relative to an inner end of the slot 360, as clearly shown in FIGS. 3A and 3B. The slot 360 (see, e.g., FIGS. 3A and 4) may be sized and configured for receipt of a securing element such as a screw, a nail, a bolt, a rod, a stake or some other retaining component. In one example, a user of the ladder may position the ladder 100 relative to a structure that is to be accessed via the ladder 100 and then place a screw, nail or other element through the slot 360 into the ground surface. For example, a user may place a nail or screw into a sub-floor of a newly constructed home or other structure. Because the slot is open-faced (e.g., not a closed curve), the user may remove the ladder 100 from the screw, nail or other securing element by sliding the feet 116 or 300 of the ladder 100 forward and away from the securing element—the securing element staying in place in the support surface. If desired, the user may leave the securing element in the support surface (e.g., while working briefly at another adjacent location), and then return the ladder to its position to be secured again by the securing elements by sliding the open-faced slot 360 back into engagement with the securing element (e.g., nail or screw). Examples of such a securing feature may be found, for example, in previously incorporated U.S. Provisional Patent Application No. 62/404,672.

While the invention may be susceptible to various modifications and alternative forms, specific embodiments have been shown by way of example in the drawings and have been described in detail herein. However, it should be understood that the invention is not intended to be limited to the particular forms disclosed. Indeed, features or elements of any disclosed embodiment may be combined with features or elements of any other disclosed embodiment without limitation. The invention includes all modifications, equivalents, and alternatives falling within the spirit and scope of the invention as defined by the following appended claims.

What is claimed is:

1. A ladder, comprising:

a pair of spaced apart rails;

a plurality of rungs extending between, and coupled to, the pair of spaced apart rails;

a pair of feet, each foot of the pair of feet including:

a first end having a pair of extending portions defining an open-faced slot;

a second end positioned opposite the first end, the second end including at least one pointed portion;

a foot mechanism coupling the foot to a respective rail of the pair of spaced apart rails, wherein the foot is rotatable at the foot mechanism between a first orientation relative to the respective rail and a second orientation relative to the respective rail; and a cam groove receiving a first pin and an opening receiving a second pin, wherein the foot is rotatable about the second pin;

wherein, in the first orientation, the first end and the second end lie in a first plane parallel to a ground support surface for the ladder while the pair of spaced apart rails are in an upright orientation relative to the ground support surface;

wherein, in the second orientation, the first end and the second end lie in a second plane parallel to a longitudinal axis of the respective rail of the pair of spaced apart rails; and wherein the second pin is translatable relative to the first pin in a direction parallel to the longitudinal axis of the respective rail.

2. The ladder of claim 1, wherein a notch extends from an end of the cam groove, the first pin being receivable in the notch when the foot is in the second orientation.

3. The ladder of claim 1, wherein the first pin is biased relative to the second pin by a biasing member.

4. The ladder of claim 1, wherein the first pin is positioned at a greater distance from the second pin while in the foot is in the first orientation as compared to while the foot is in the second orientation.

5. The ladder of claim 1, wherein, in the first orientation, the pair of spaced apart rails tilt away from the open-faced slot.

6. The ladder of claim 1, wherein the pair of extending portions include tips curved downward relative to an inner end of the open-faced slot.

7. The ladder of claim 1, wherein each foot of the pair of feet further comprises a slip reduction material coupled to a bottom surface of the foot.

8. The ladder of claim 7, wherein the open-faced slot extends through the slip reduction material.

9. A ladder, comprising:
- a pair of spaced apart rails;
- a plurality of rungs extending between, and coupled to, the pair of spaced apart rails;
- a foot coupled with a rail of the pair of spaced apart rails, the foot comprising:
  - a plate member having a first end and a second end, the first end including an open-faced slot having parallel sides aligned with an axis through the first end and the second end;
  - a pad coupled to a bottom surface of the plate member and configured for engagement with a ground surface;
  - at least one sidewall extending upward from the plate member;
  - a pivot opening defined in the at least one sidewall;
  - a curved groove defined in the at least one sidewall;
- a body attachable to the rail and comprising:
  - a slot defined in the body;
  - an aperture defined in the body;
- a first pin extending through the pivot opening and through the slot, wherein the foot is rotatable relative to the body about the first pin;
- a second pin extending through the curved groove and through the aperture, wherein, in response to rotation of the foot relative to the body, the first pin translates relative to the second pin.

10. The ladder of claim 9, wherein the open-faced slot is defined between a pair of fingers extending from the plate member parallel to the axis.

11. The ladder of claim 9, wherein the pair of fingers at least partially cover a front surface of the pad.

12. The ladder of claim 9, wherein the curved groove includes a first end notch portion and a curved portion, wherein the first end notch portion extends radially away from a center of curvature of the curved portion.

13. The ladder of claim 9, wherein the pad defines a traction surface having a first portion and a second portion, the first portion having a larger radius of curvature than the second portion.

14. A ladder assembly, comprising:
- a pair of spaced apart rails;
- a set of rungs positioned between and coupled to the pair of spaced apart rails;
- a pair of feet, each foot of the pair of feet including:
  - at least one flange;
  - a first end having an open-faced slot defined therein;
  - a second end;
  - a foot mechanism pivotally coupling the foot to a rail of the pair of spaced apart rails, wherein the foot mechanism is configured to bias the foot to a position relative to the rail wherein the second end faces downward and the first end faces upward; and
  - a traction surface configured to engage a ground surface, wherein the open-faced slot extends through the traction surface.

15. The ladder assembly of claim 14, wherein the foot mechanism comprises a biasing member biasing a first pin longitudinally away from a second pin, the first pin extending through the foot mechanism and through the at least one flange, the second pin extending through the foot mechanism and through the at least one flange.

16. The ladder assembly of claim 15, wherein a cam groove is formed in the at least one flange, wherein the first pin extends through the cam groove and through an aperture in the foot mechanism.

17. The ladder assembly of claim 14, wherein the second end comprises a penetrating portion.

* * * * *